(12) United States Patent
Frenzel et al.

(10) Patent No.: US 9,988,069 B2
(45) Date of Patent: Jun. 5, 2018

(54) DEVICE FOR SECURING A CASING TUBE SHIFTING MODULE TO THE CASING TUBE OF A STEERING SHAFT OF A MOTOR VEHICLE

(71) Applicant: Leopold Kostal GmbH & Co. KG, Luedenscheid (DE)

(72) Inventors: Maik Frenzel, Luedenscheid (DE); Klaus Hirschfeld, Luedenscheid (DE); Michael Langs, Luedenscheid (DE); Martin Deitmerg, Luedenscheid (DE)

(73) Assignee: Leopold Kostal GmbH & Co. KG, Luedenscheid (DE)

( * ) Notice: Subject to any disclaimer, the term of this patent is extended or adjusted under 35 U.S.C. 154(b) by 82 days.

(21) Appl. No.: 15/367,424

(22) Filed: Dec. 2, 2016

(65) Prior Publication Data

US 2017/0080968 A1 Mar. 23, 2017

Related U.S. Application Data

(63) Continuation of application No. PCT/EP2015/063352, filed on Jun. 15, 2015.

(30) Foreign Application Priority Data

Jun. 17, 2014 (DE) .................. 10 2014 008 933

(51) Int. Cl.
*B62D 1/16* (2006.01)
(52) U.S. Cl.
CPC ................... *B62D 1/16* (2013.01)
(58) Field of Classification Search
CPC ...... B62D 1/16; B62D 15/022; B60Q 1/1461; Y10T 74/20256; Y10T 70/5956

(Continued)

(56) References Cited

U.S. PATENT DOCUMENTS 2,611,043 A * 9/1952 Gazda ................... B60Q 1/425
200/315
2,690,483 A * 9/1954 Lautzenhiser ........... B60Q 1/42
200/61.35

(Continued)

FOREIGN PATENT DOCUMENTS

DE 19942247 C1 1/2001
DE 19942818 A1 * 3/2001 ........... B60Q 1/1461

(Continued)

OTHER PUBLICATIONS

European Patent Office, International Search Report for the corresponding International Application No. PCT/EP2015/063352 dated Sep. 24, 2015.

(Continued)

*Primary Examiner* — Keith J Frisby
(74) *Attorney, Agent, or Firm* — Brooks Kushman P.C.

(57) ABSTRACT

A steering column module includes a tubular jacket rotatably supporting a steering shaft, a switch module having a carrier including contact pressure surfaces, and a device for fastening the switch module to the tubular jacket. The device includes a clamp assembly between the tubular jacket and the switch module for exerting a clamping force on the tubular jacket. The clamp includes two half clamps each having two outwardly bent end flanges. The end flanges are axially movably accommodated in the carrier such that when the switch module is axially moved onto the tubular jacket the end flanges come into contact with axial end stops of the tubular jacket and the contact pressure surfaces of the carrier. The contact pressure surfaces exert forces on the end flanges as the switch module is axially moved onto the tubular jacket thus fastening the switch module to the tubular jacket with a clamping action.

16 Claims, 3 Drawing Sheets

(58) Field of Classification Search
USPC .............................. 74/492, 484 R; 200/61.27
See application file for complete search history.

(56) References Cited

U.S. PATENT DOCUMENTS

| | | | | |
|---|---|---|---|---|
| 2,714,815 | A | * | 8/1955 | Nordstrom ............ B60R 25/066 70/211 |
| 3,110,012 | A | * | 11/1963 | Manning .................. B60Q 1/46 340/464 |
| 4,091,372 | A | * | 5/1978 | Blaha ..................... B60Q 5/003 200/61.88 |
| 5,804,785 | A | * | 9/1998 | Uchiyama ............ B60Q 1/1476 200/61.27 |
| 6,892,602 | B2 | | 5/2005 | Hirschfeld et al. |
| 7,757,569 | B2 | | 7/2010 | Hebenstreit et al. |
| 2004/0055408 | A1 | | 3/2004 | Hirschfeld et al. |
| 2009/0183588 | A1 | | 7/2009 | Hebenstreit et al. |

FOREIGN PATENT DOCUMENTS

| | | |
|---|---|---|
| DE | 102004014104 A1 | 10/2005 |
| DE | 102005040141 A1 | 3/2007 |
| DE | 102007060631 A1 | 6/2009 |
| EP | 1319573 A1 | 6/2003 |
| EP | 1403168 A2 | 3/2004 |

OTHER PUBLICATIONS

German Patent and Trademark Office, German Search Report for the corresponding German Patent Application No. 10 2014 008 933.9 dated Jan. 20, 2015.

\* cited by examiner

DEVICE FOR SECURING A CASING TUBE SHIFTING MODULE TO THE CASING TUBE OF A STEERING SHAFT OF A MOTOR VEHICLE

CROSS-REFERENCE TO RELATED APPLICATIONS

This application is a continuation of International Application No. PCT/EP2015/063352, published in German, with an International filing date of Jun. 15, 2015, which claims priority to DE 10 2014 008 933.9, filed Jun. 17, 2014; the disclosures of which are hereby incorporated in their entirety by reference herein.

TECHNICAL FIELD

The present invention relates to a device for fastening a tubular jacket switch module to the tubular jacket of a steering shaft of a vehicle when a steering wheel is being attached to the steering shaft, the device includes a clamping member assembly between the tubular jacket and the tubular jacket switch module for exerting a clamping force on the tubular jacket in a radial direction, wherein a clamping force is transmitted to the clamping member assembly via the stator side of a bearing situated concentrically with respect to the steering shaft for the rotational decoupling of the steering wheel with respect to the tubular jacket switch module by generating a relative movement between the tubular jacket switch module and the tubular jacket.

BACKGROUND

Tubular jacket switch modules (tubular jacket shifting modules, casing tube shifting or switch modules) are switch modules situated in the area of the tubular jacket (the casing tube) of a steering shaft of a motor vehicle. A tubular jacket switch module may carry steering column switches and the like, for example. Part of the tubular jacket switch module may also be a coil spring cartridge, an angle sensor, or the like.

The tubular jacket switch module is situated generally concentrically with respect to the tubular jacket of the steering shaft and the tubular jacket switch module is attached to the tubular jacket. A reinforcement and coupling module rigidly connected to the tubular jacket, as described in DE 199 42 247 C1, may be used for fastening the tubular jacket switch module. The reinforcement and coupling module includes connecting elements to which the tubular jacket switch module may be fastened, for example, by a stable clip connection. For creating the overall steering column module, the tubular jacket switch module is first fastened to the tubular jacket and the steering wheel is then mounted on the end of the steering shaft which passes through the tubular jacket switch module.

In other embodiments, the tubular jacket switch module is held on the tubular jacket by clamps or axial fastening means.

EP 1 403 168 B1 (corresponding to U.S. Pat. No. 6,892,602) describes a device for fastening a tubular jacket switch module to the tubular jacket of a steering shaft of a vehicle. The fastening takes place due to the steering wheel being attached to the steering shaft. The device includes a clamping member assembly. The clamping member assembly is supported on a side of the tubular jacket switch module and is situated radially or in a radially acting assembly between the tubular jacket and the tubular jacket switch module or a carrier associated with the tubular jacket switch module. A bearing is situated concentrically with respect to the steering shaft. The steering wheel or the steering wheel hub rests on the rotor side of the bearing. Clamping of the tubular jacket switch module with radially acting clamping forces takes place via the clamping member assembly. The tubular jacket switch module as a whole is moved in the axial direction with respect to the tubular jacket in order to apply a clamping force between the tubular jacket and the tubular jacket switch module. During this movement for fixing the tubular jacket switch module to the clamping member assembly, the stator side of the bearing directly or indirectly acts on the tubular jacket switch module.

SUMMARY

An object includes a device for fastening a tubular jacket switch module to the tubular jacket of a steering shaft, the fastening taking place due to a steering wheel being attached to the steering shaft, in which the device compared to the Background Art has the advantage that a fastening which is at least just as secure is made possible using a clamping member assembly having a simpler design and which thus may be manufactured at lower cost.

In carrying out at least one of the above and/or other objects, a steering column module is provided. The steering column module includes a tubular jacket rotatably supporting a steering shaft, a tubular jacket switch module having a carrier including contact pressure surfaces, an a device for fastening the tubular jacket switch module to the tubular jacket. The device includes a clamping member assembly situated between the tubular jacket and the tubular jacket switch module for exerting a clamping force on the tubular jacket in a radial direction. The clamping member assembly includes two half clamps. Each half clamp has two outwardly bent end flanges. The end flanges are accommodated in an axially moveable manner in the carrier of the tubular jacket switch module in such a way that when the tubular jacket switch module is axially moved onto the tubular jacket the end flanges come into contact with axial end stops on an outer surface of the tubular jacket and the contact pressure surfaces of the carrier. The contact pressure surfaces exert forces on the end flanges which act in parallel to a tangential direction of the tubular jacket as the tubular jacket switch module is axially moved onto the tubular jacket causing the end flanges to move radially inward toward one another and thus fastening the tubular jacket switch module to the tubular jacket with a clamping action.

Further, in carrying out at least one of the above and/or other objects, a device for fastening a tubular jacket switch module to a tubular jacket rotatably supporting a steering shaft is provided. An outer surface of the tubular jacket has axial end stops and the tubular jacket switch module includes a carrier having contact pressure surfaces. The device includes a clamping member assembly to be situated between the tubular jacket and the tubular jacket switch module for exerting a clamping force on the tubular jacket in a radial direction. The clamping member assembly includes two half clamps. Each half clamp has two outwardly bent end flanges. The end flanges are to be accommodated in an axially moveable manner in the carrier of the tubular jacket switch module in such a way that when the tubular jacket switch module is axially moved onto the tubular jacket the end flanges come into contact with the axial end stops of the tubular jacket and the contact pressure surfaces of the carrier such that the contact pressure surfaces exert forces on the end flanges which act in parallel to a tangential direction of the tubular jacket as the tubular jacket switch module is axially moved onto the tubular jacket causing the end flanges to move radially inward toward one another and thus fastening the tubular jacket switch module to the tubular jacket with a clamping action.

An embodiment provides a device for securing a tubular jacket switch module to a tubular jacket of a steering shaft of a vehicle when attaching a steering wheel to the steering shaft. The device includes a clamping member assembly. The clamping member assembly is arranged between the tubular jacket and the tubular jacket switch module for exerting a clamping force on the tubular jacket in a radial direction. A clamping force is transmitted to the clamping member assembly via the stator side of a bearing for the rotational decoupling of the steering wheel in relation to the tubular jacket switch module by generating a relative movement between the tubular jacket switch module and the tubular jacket.

The clamping member assembly includes two half clamps. Each half clamp has two outwardly bent end flanges. The end flanges are accommodated in an axially moveable manner in a carrier of the tubular jacket switch module. The end flanges are axially accommodated in the carrier of the tubular jacket switch module in such a way that when sliding the tubular jacket switch module onto the tubular jacket the end flanges come into contact with corresponding axial end stops formed on the tubular jacket.

Contact pressure surfaces are formed in the carrier of the tubular jacket switch module. The contact pressure surfaces come into contact with the end flanges of the half clamps when sliding the tubular jacket switch module axially onto the tubular jacket. The contact pressure surfaces in contact with the end flanges exert forces on the end flanges. The forces act in parallel to the tangential direction of the tubular jacket to cause the end flanges to move radially inward toward one another. As such, the contact pressure surfaces exert the forces on the end flanges as the axial mounting movement continues thus fastening the tubular jacket switch module to the tubular jacket with a clamping action.

In embodiments, a device for fastening a tubular jacket switch module to the tubular jacket of a steering shaft, in which the fastening takes place upon a steering wheel being attached to the steering shaft, includes a clamping member assembly formed by two half clamps. Each half clamp includes two outwardly bent end flanges. The end flanges (four of them) are respectively accommodated in an axially movable or slid-able manner in a carrier of the tubular jacket switch module. The end flanges are accommodated in the carrier in such way that when the tubular jacket switch module is pushed onto the tubular jacket the end flanges come into contact with associated axial end stops formed on the tubular jacket. Contact pressure surfaces are formed in the carrier of the tubular jacket switch module. The contact pressure surfaces come into contact with the end flanges of the half clamps when the relative axial movement between the tubular jacket switch module and the tubular jacket is generated. The contact pressure surfaces in contact with the end flanges exert forces on the end flanges. The forces exerted by the contact pressure surfaces act in parallel to the tangential direction of the tubular jacket to thereby move the end flanges radially inward toward one another.

Axial movement between the tubular jacket switch module and the tubular jacket is necessary for tensioning the half clamps of the clamping member assembly. Axial movement between the tubular switch module and the tubular jacket results from axial movement of the steering wheel when the steering wheel is screwed onto the free end of the steering shaft. The axial movement of the steering wheel is transferred via a bearing situated concentrically with respect to the steering shaft when the steering wheel is mounted and screwed onto the free end of the steering shaft to cause the axial movement between the tubular jacket switch module and the tubular jacket.

The half clamps of the clamping member assembly become tensioned when the steering wheel is attached to the steering shaft (i.e., upon the steering wheel being attached to the steering shaft). The tubular jacket switch module is thus fixed to the tubular jacket when the steering wheel is attached to the steering shaft. As such, the device including the clamping member assembly with the tensioned half clamps fastens the tubular jacket switch module to the tubular jacket of the steering shaft when the steering wheel is attached to the steering shaft.

In this regard, it may be provided that the tubular jacket switch module is mounted together with the steering wheel on the free end of a steering column and fixed to the tubular jacket by tightening the steering wheel screw. It may likewise be provided that the tubular jacket switch module is initially mounted on the free end of the steering column and that the actual fixing of the tubular jacket switch module to the tubular jacket does not take place until the steering wheel is fastened to the free end of the steering shaft. This may be meaningful when additional assembly steps are to be carried out between the step of mounting the tubular jacket switch module and the step of fastening the steering wheel to the free end of the steering shaft.

In an embodiment, at least one of the half clamps includes a radially outwardly formed protrusion and the carrier of the tubular jacket switch module includes a fixing tab. The fixing tab is formed as one piece with the carrier. The fixing tab is accommodated between the protrusion of the at least one of the half clamps and the tubular jacket.

In an embodiment, form-fit fixing and anti-twist protection of the carrier on the tubular jacket are achieved due to a radial outwardly turned tongue or protrusion on the tubular jacket together with a formation on the fixing tab associated therewith.

In an embodiment, additional radially outwardly turned tongues or protrusions which form axial end stops for the half clamps are mounted on the tubular jacket.

The fastening device is also easily detachable from the tubular jacket. For this purpose, the tubular jacket switch module is pulled off the tubular jacket in a direction opposite its mounting direction. For assistance with such disassembly, in an embodiment, the device includes return springs which assist with this movement. The return springs are supported at their lower ends on shoulders integrally formed on the half clamps and their upper ends rest against inner walls of the carrier. During assembly of the tubular jacket switch module the return springs are pre-tensioned so that they attempt to relax during a desired disassembly. Accordingly, when the steering wheel is detached from the steering shaft the return springs push the tubular jacket switch module away from the tubular jacket.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to the FIGURES, a device for securing a tubular jacket switch module (tubular jacket shifting module, casing tube shifting or switch module) to a tubular jacket 1 (casing tube) of a steering shaft 2 of a vehicle when attaching a steering wheel to the steering shaft will be described. The device for securing the tubular jacket switch module to tubular jacket 1 includes a clamping member assembly. The clamping member assembly is used in fastening the tubular jacket switch module to tubular jacket 1. The clamping member assembly includes a first half clamp 4 and a second half clamp 5. First half clamp 4 has a pair of end flanges 4' and second half clamp 5 has a pair of end flanges 5'. End flanges 4', 5' are outwardly bent.

Figure 1:
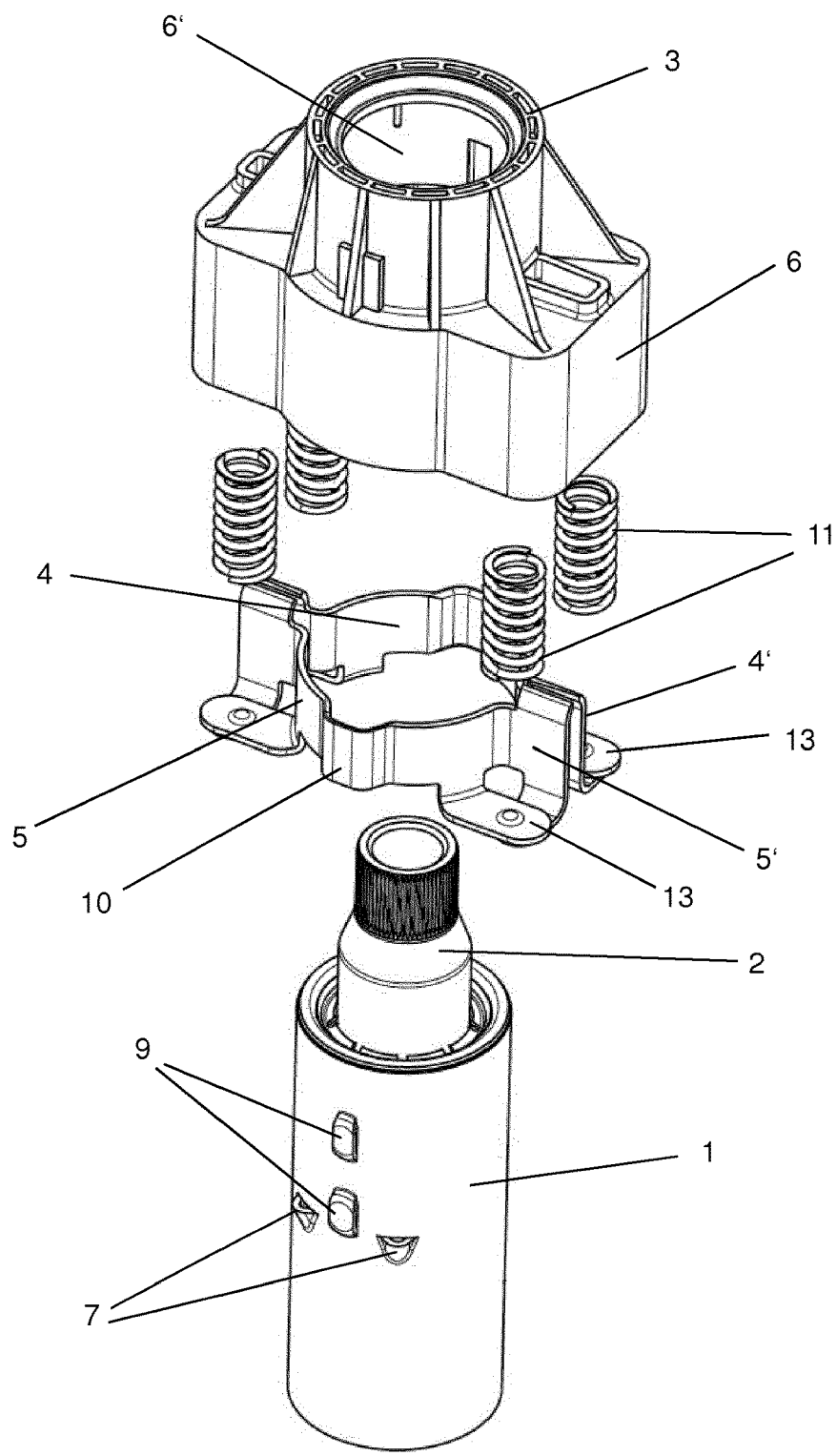
FIG. 1 illustrates an exploded view of a steering column having a tubular jacket, a carrier of a tubular jacket switch module, and a clamping member assembly having a pair of half clamps each having a pair of end flanges, the clamping member assembly for fastening the tubular jacket switch module to the tubular jacket.
Figure 2A:
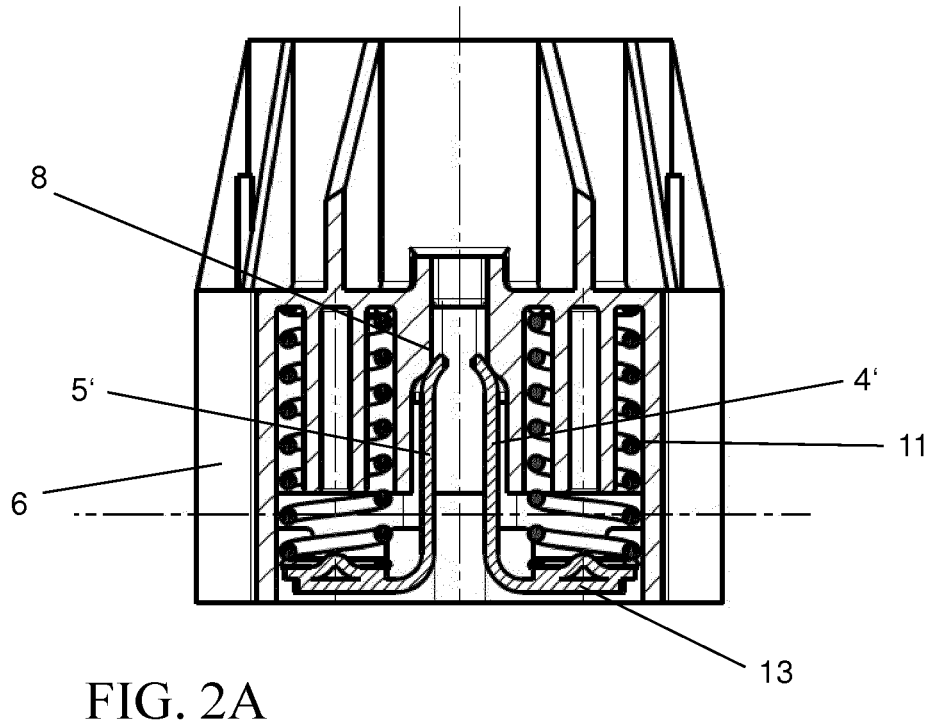
FIG. 2A illustrates a longitudinal section of the carrier in the area of the end flanges on one side of the half clamps of the clamping member assembly in a preassembly position of the steering column.
Figure 2B:
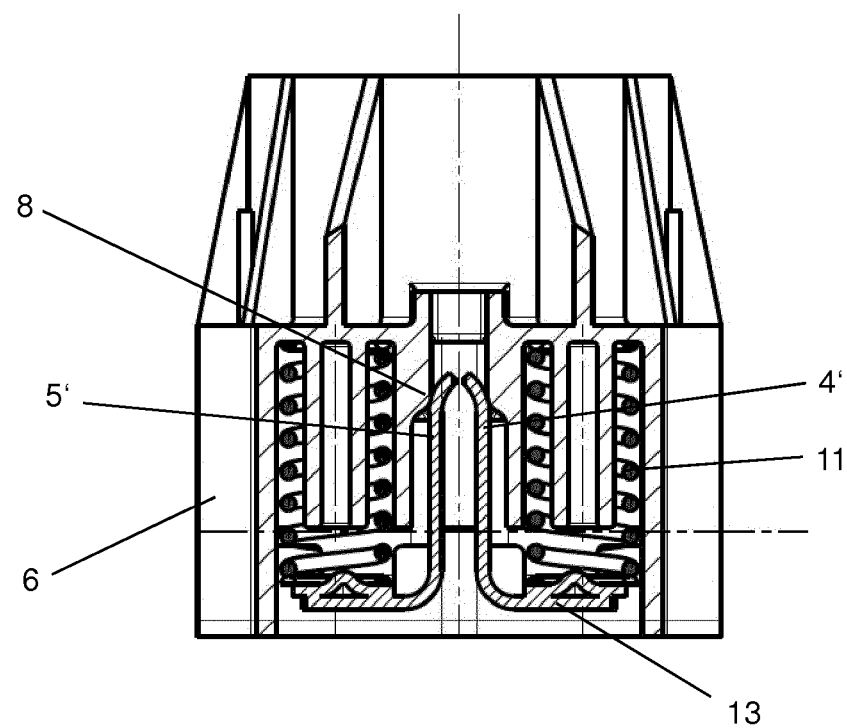
FIG. 2B illustrates a longitudinal section of the carrier in the area of the end flanges on one side of the half clamps of the clamping member assembly in a final assembly position of the steering column.
Figure 3A:
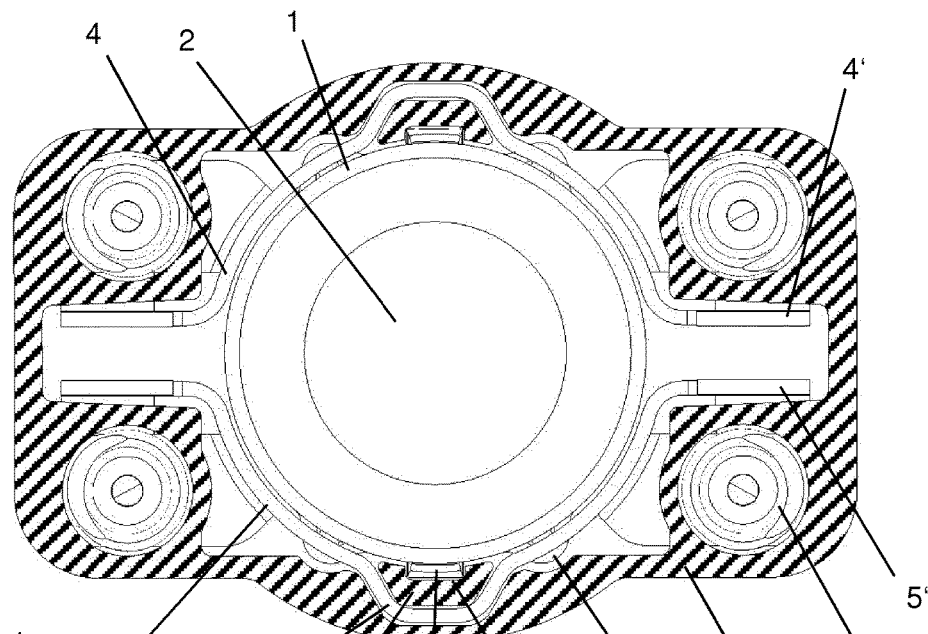
FIG. 3A illustrates a cross-section of the carrier in the area of the half clamps of the clamping member assembly in the preassembly position of the steering column.
Figure 3B:
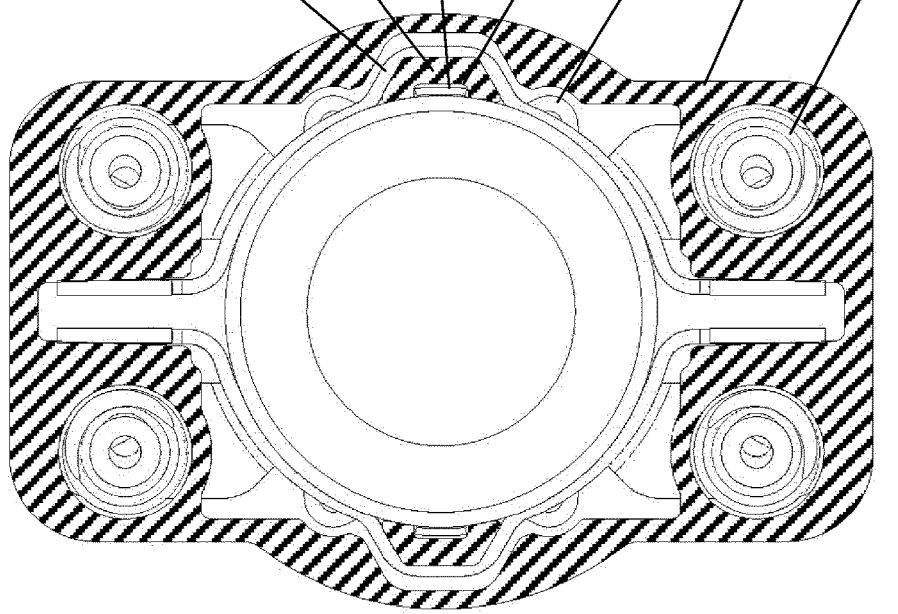
FIG. 3B illustrates a cross-section of the carrier in the area of the half clamps of the clamping member assembly in the final assembly position of the steering column.

FIG. 1 illustrates an exploded view of a steering column having tubular jacket 1 and a carrier 6 of the tubular jacket switch module (only carrier 6 of the tubular jacket switch module is shown in the FIGURES—carrier 6 is representative the tubular jacket switch module). FIG. 2A illustrates a longitudinal section of carrier 6 in the area of end flanges 4', 5' on one side of half clamps 4, 5 of the clamping member assembly in a preassembly position of the steering column. FIG. 2B illustrates a longitudinal section of carrier 6 in the area of end flanges 4', 5' on one side of half clamps 4, 5 in a final assembly position of the steering column. FIG. 3A illustrates a cross-section of carrier 6 in the area of half clamps 4, 5 in the preassembly position of the steering column. FIG. 3B illustrates a cross-section of carrier 6 in the area of half clamps 4', 5' in the final assembly position of the steering column.

For fastening carrier 6 to tubular jacket 1, the clamping member assembly is arranged between the tubular jacket and the carrier to exert a clamping force on the tubular jacket in a radial direction. A clamping force is transmitted to the clamping member assembly via the stator side of a bearing 3 of carrier 6. Bearing 3 is situated concentrically with respect to steering shaft 2. The clamping force is transmitted to the clamping member assembly for the rotational decoupling of the steering wheel in relation to carrier 6 by generating a relative movement between the carrier and tubular jacket 1.

End flanges 4', 5' are accommodated in an axially moveable manner in carrier 6. End flanges 4', 5' are axially accommodated in carrier 6 in such a way that when sliding the carrier onto tubular jacket 1 the end flanges come into contact with corresponding axial end stops 7 formed on the outer surface of the tubular jacket.

Contact pressure surfaces 8 are formed in carrier 6 as shown in FIGS. 2A and 2B. Contact pressure surfaces 8 come into contact with end flanges 4', 5' of half clamps 4, 5 when sliding carrier 6 onto tubular jacket 1. Contact pressure surfaces 8 in contact with end flanges 4', 5' exert forces on the end flanges. The forces act in parallel to the tangential direction of tubular jacket 1 to cause end flanges 4', 5' to move radially inward toward one another (compare FIG. 2B with FIG. 2A).

Steering shaft 2 is rotatably supported in tubular jacket 1. The steering wheel (not shown) is fastened to the free end of steering shaft 2 by a steering wheel screw or the like. The free end of steering shaft 2 includes gear teeth as shown in FIG. 1. The free end of steering shaft 2 is inserted into a correspondingly designed mounting sleeve of the steering wheel hub. The free end-face surface of the mounting sleeve rests against the rotor side of bearing 3 of carrier 6. As noted, bearing 3 is situated concentrically with respect to steering shaft 2.

Carrier 6 of the tubular jacket switch module concentrically surrounds tubular jacket 1 in the area of the upper end of the tubular jacket. For this purpose, carrier 6 includes a socket-shaped receptacle 6' into which the free end of tubular jacket 1 engages. The clamping member assembly used for fixing carrier 6 to tubular jacket 1 is accommodated on the inner side of the socket-shaped receptacle 6' in the carrier. Half clamps 4, 5 of the clamping member assembly are formed and accommodated in carrier 6 in such a way that they enclose tubular jacket 1 with a small amount of play when the carrier is pushed onto the tubular jacket. End flanges 4', 5' of half clamps 4, 5 are held in an axially displaceable manner in carrier 6.

Approximately in the center between their respective end flanges 4', 5', half clamps 4, 5 include radially outwardly formed protrusions 10. Carrier 6 includes integrally formed fixing tabs 12 as shown in FIGS. 3A and 3B. Fixing tabs 12 of carrier 6 are situated between protrusions 10 of half clamps 4, 5 and tubular jacket 1.

Half clamps 4, 5 of the clamping member assembly further include integrally formed shoulders 13 as shown in FIGS. 1, 2A, and 2B. The device further includes return springs 11. Shoulders 13 of half clamps 4, 5 respectively support return springs 11 at one end of the return springs. The other ends of return springs 11 rest against oppositely situated inner walls of carrier 6. Return springs 11 are in the relaxed state in the starting position prior to installation of the tubular jacket switch module.

Half clamps 4, 5 of the clamping member assembly come to rest on axial end stops 7 formed on tubular jacket 1 when carrier 6 is pushed onto tubular jacket 1. Axial end stops 7 are formed on tubular jacket 1 by radially outwardly turned tongues or protrusions on the tubular jacket 1 as shown in FIGS. 1, 3A, and 3B.

An axial movement of carrier 6 toward tubular jacket 1 is completed via the steering wheel hub when the steering wheel is mounted. This axial movement, which is necessary for mounting the steering wheel, is transferred via bearing 3 to carrier 6. For this purpose, the steering wheel or the steering wheel hub rests against the stator side of bearing 3. The axial mounting movement is thus transferred to carrier 6 during mounting of the steering wheel. Prior to the mounting of carrier 6, half clamps 4, 5 are situated near the open side of socket-shaped receptacle 6' in the carrier facing away from the steering wheel. During the course of the axial mounting movement, half clamps 4, 5 come to rest on axial end stops 7 formed on tubular jacket 1.

As the axial mounting movement continues, carrier 6 is moved further against half clamps 4, 5 which are now fixed. This is apparent in FIGS. 2A and 2B in which this operation corresponds to the change in the relative position of carrier 6 with respect to half clamps 4, 5 from FIG. 2A to FIG. 2B. In the process, on the one hand, return springs 11 are compressed and thus tensioned, and on the other hand, contact pressure surfaces 8 formed in carrier 6 come to rest against end flanges 4', 5' of half clamps 4, 5.

Contact pressure surfaces 8 of casing 6 are formed as oblique planes that mutually converge in the direction of the top side of the casing. Contact pressure surfaces 8 in contact with half clamps 4, 5 exert forces on the half clamps. The forces exerted by contact pressure surfaces 8 on half clamps 4, 5 act in parallel to the tangential direction of tubular jacket 1 as the axial mounting movement continues thus fastening carrier 6 to tubular jacket 1 with a clamping action. In the process, fixing tabs 12, which are formed as one piece with carrier 6, are clamped between protrusions 10 of half clamps 4, 5 and tubular jacket 1, as is apparent FIGS. 3A and 3B in which this operation corresponds to the change from FIG. 3A to FIG. 3B.

To further improve the fastening, tubular jacket 1 further includes radially outwardly turned tongues or protrusions 9. Protrusions 9 of tubular jacket 1 engage with associated formations 12' of fixing tabs 12 of carrier 6. On the one hand, anti-twist protection of carrier 6 with respect to tubular jacket 1 is achieved, and on the other hand, not only force-fit but also form-fit fixing of the carrier to the tubular jacket is achieved by an appropriate configuration of formations 12' of fixing tabs 12 in relation to the protrusions of the tubular jacket.

Disassembly of the tubular jacket switch module takes place in the opposite manner. After the steering wheel is removed from steering shaft 2, the tubular jacket switch module together with its carrier 6 is pulled off tubular jacket 1 in the axial direction. Return springs 11, which relax during this operation and support the disassembly process with their elastic force, are used to facilitate release of the clamping which acts between carrier 6 and tubular jacket 1.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A steering column module comprising:
 a tubular jacket rotatably supporting a steering shaft, an outer surface of the tubular jacket having axial end stops;
 a tubular jacket switch module having a carrier, the carrier having contact pressure surfaces;
 a device for fastening the tubular jacket switch module to the tubular jacket, the device including a clamping member assembly situated between the tubular jacket and the tubular jacket switch module for exerting a clamping force on the tubular jacket in a radial direction; and
 wherein the clamping member assembly includes two half clamps, each half clamp having two outwardly bent end flanges, the end flanges being accommodated in an axially moveable manner in the carrier of the tubular jacket switch module in such a way that when the tubular jacket switch module is axially moved onto the tubular jacket the end flanges come into contact with the axial end stops of the tubular jacket and the contact pressure surfaces of the carrier, wherein the contact pressure surfaces exert forces on the end flanges which act in parallel to a tangential direction of the tubular jacket as the tubular jacket switch module is axially moved onto the tubular jacket causing the end flanges to move radially inward toward one another and thus fastening the tubular jacket switch module to the tubular jacket with a clamping action.

2. The steering column module of claim 1 wherein:
 at least one of the half clamps of the clamping member assembly includes a radially outwardly formed protrusion;
 the carrier of the tubular jacket switch module further includes a fixing tab; and
 the fixing tab is accommodated between the protrusion of the at least one of the half clamps and the tubular jacket.

3. The steering column module of claim 2 wherein:
 the outer surface of the tubular jacket further includes a radially outwardly turned tongue, the tongue cooperates with the fixing tab of the carrier of the tubular jacket switch module to achieve form-fit fixing and anti-twist protection of the carrier on the tubular jacket.

4. The steering column module of claim 1 wherein:
 the axial end stops of the outer surface of the tubular jacket are radially outwardly turned protrusions.

5. The steering column module of claim 1 further comprising:
 a plurality of return springs situated so as to act with their elastic force opposite to axial movement of the tubular jacket switch module onto the tubular jacket.

6. The steering column module of claim 5 wherein:
 the half clamps of the clamping member assembly further include shoulders on which the return springs are supported.

7. A device for fastening a tubular jacket switch module to a tubular jacket rotatably supporting a steering shaft, wherein an outer surface of the tubular jacket has axial end stops and the tubular jacket switch module includes a carrier having contact pressure surfaces, the device comprising:
 a clamping member assembly to be situated between the tubular jacket and the tubular jacket switch module for exerting a clamping force on the tubular jacket in a radial direction; and
 wherein the clamping member assembly includes two half clamps, each half clamp having two outwardly bent end flanges, the end flanges to be accommodated in an axially moveable manner in the carrier of the tubular jacket switch module in such a way that when the tubular jacket switch module is axially moved onto the tubular jacket the end flanges come into contact with the axial end stops of the tubular jacket and the contact pressure surfaces of the carrier such that the contact pressure surfaces exert forces on the end flanges which act in parallel to a tangential direction of the tubular jacket as the tubular jacket switch module is axially moved onto the tubular jacket causing the end flanges to move radially inward toward one another and thus fastening the tubular jacket switch module to the tubular jacket with a clamping action.

8. The device of claim 7 wherein:
at least one of the half clamps of the clamping member assembly includes a radially outwardly formed protrusion, the protrusion to accommodate a fixing tab of the carrier of the tubular jacket switch module against the tubular jacket.

9. The device of claim 7 wherein:
the clamping member assembly further includes a plurality of return springs situated so as to act with their elastic force opposite to axial movement of the tubular jacket switch module onto the tubular jacket.

10. The device of claim 9 wherein:
the half clamps of the clamping member assembly further include shoulders on which the return springs are supported.

11. A device for fastening a tubular jacket switch module to a tubular jacket of a steering shaft of a vehicle when attaching a steering wheel to the steering shaft, the device comprising:
a clamping member assembly situated between the tubular jacket and the tubular jacket switch module for exerting a clamping force on the tubular jacket in a radial direction, wherein a clamping force is transmitted to the clamping member assembly via a stator side of a bearing for a rotational decoupling of the steering wheel with respect to the tubular jacket switch module by generating a relative axial movement between the tubular jacket switch module and the tubular jacket;
wherein the clamping member assembly includes two half clamps, each half clamp having two outwardly bent end flanges, the end flanges being accommodated in an axially moveable manner in a carrier of the tubular jacket switch module in such a way that when the tubular jacket switch module is pushed onto the tubular jacket the end flanges come into contact with associated axial end stops formed on the tubular jacket; and
wherein contact pressure surfaces are formed in the carrier of the tubular jacket switch module, the contact pressure surfaces come into contact with the end flanges of the half clamps when the relative movement between the tubular jacket switch module and the tubular jacket is generated, and the contact pressure surfaces exert forces on the end flanges of the half clamps which act in parallel to a tangential direction of the tubular jacket.

12. The device of claim 11 wherein:
at least one of the half clamps of the clamping member assembly includes a radially outwardly formed protrusion;
the carrier of the tubular jacket switch module further includes a fixing tab; and
the fixing tab is accommodated between the protrusion of the at least one of the half clamps and the tubular jacket.

13. The device of claim 12 wherein:
an outer surface of the tubular jacket includes a radially outwardly turned tongue, the tongue cooperates with the fixing tab of the carrier of the tubular jacket switch module to achieve form-fit fixing and anti-twist protection of the carrier on the tubular jacket.

14. The device of claim 11 wherein:
the axial end stops of the outer surface of the tubular jacket are radially outwardly turned protrusions.

15. The device of claim 11 further comprising:
a plurality of return springs situated so as to act with their elastic force opposite to axial movement of the tubular jacket switch module onto the tubular jacket.

16. The device of claim 15 wherein:
the half clamps of the clamping member assembly further include shoulders on which the return springs are supported.

* * * * *